United States Patent [19]

Calkins

[11] 4,076,686
[45] Feb. 28, 1978

[54] HEAT STABILIZED POLYCARBONATE RESIN

[75] Inventor: Thornton Ross Calkins, Pittsfield, Mass.

[73] Assignee: General Electric Company, Pittsfield, Mass.

[21] Appl. No.: 521,479

[22] Filed: Nov. 6, 1974

Related U.S. Application Data

[63] Continuation-in-part of Ser. No. 326,008, Jan. 23, 1973, abandoned, which is a continuation-in-part of Ser. No. 102,211, Dec. 28, 1970, abandoned.

[51] Int. Cl.$^2$ .................................................. C08R 5/00
[52] U.S. Cl. ...................... 260/45.8 A; 260/45.7 PH; 260/45.85 R
[58] Field of Search .................. 260/45.7, 45.8 R, 37, 260/45.8 A

[56] References Cited

U.S. PATENT DOCUMENTS

| | | | |
|---|---|---|---|
| 2,975,150 | 3/1961 | Johnson | 260/27 R |
| 3,305,520 | 2/1967 | Fritz et al. | 260/45.7 P |
| 3,448,067 | 3/1969 | Penneck | 260/23 |
| 3,489,716 | 1/1970 | Calkins | 260/45.8 |
| 3,498,946 | 3/1970 | Calkins | 260/37 |
| 3,525,706 | 8/1970 | Calkins | 260/37 |
| 3,660,331 | 5/1972 | Ludwig | 260/23 XA |

*Primary Examiner*—Lewis T. Jacobs
*Attorney, Agent, or Firm*—William F. Mufatti

[57] ABSTRACT

An unpigmented polycarbonate composition stabilized against heat degradation by employing in admixture therewith a minor amount of a phosphite which may be either a diaryl hydrogen phosphite, a dialkyl hydrogen phosphite or an alkyl aryl hydrogen phosphite or mixtures thereof. The composition may also have included with it particular epoxy compounds.

6 Claims, No Drawings

HEAT STABILIZED POLYCARBONATE RESIN

This application is a continuation-in-part of application Ser. No. 326,008, filed Jan. 23, 1973 and now abandoned, which in turn is a continuation-in-part of application Ser. No. 102,211, filed Dec. 28, 1970, now abandoned.

This invention is directed to a heat stabilized unpigmented aromatic polycarbonate resin composition wherein the aromatic polycarbonate resin composition contains in admixture therewith minor quantities of either dialkyl or diaryl or mixtures of dialkyl and diaryl hydrogen phosphites and with or without a particular epoxy compound.

BACKGROUND OF THE INVENTION

Many thermoplastic polymers per se require stabilization against discoloration when exposed to elevated temperatures. Certain materials have been found that are suitable for stabilizing a thermoplastic polymer against discoloration due to elevated temperatures. Particularly useful are certain phosphites as disclosed in U.S. Pat. No. 3,305,520 for stabilizing polycarbonates, which patent discloses solely triaryl or trialkyl phosphites as such stabilizers. Canadian Pat. No. 727,700 discloses employing trialkyl or triaryl phosphites in combination with tetraaryl tin compounds to stabilize polycarbonates. It has now been discovered that particular hydrogen phosphites are excellent in stabilizing polycarbonate resins against discoloration due to exposure at elevated temperatures.

Therefore, it is an object of this invention to provide a heat and color stable unpigmented aromatic polycarbonate resin.

Another object of this invention is to provide a heat and color stable unpigmented aromatic polycarbonate resin composition containing in admixture therewith particular hydrogen phosphites.

Yet another object of this invention is to provide a heat and color stable unpigmented aromatic polycarbonate resin composition having in admixture a polycarbonate, minor amounts of a phosphite and an epoxy.

These and other objects of this invention will become apparent from the following detailed description thereof.

DESCRIPTION OF THE INVENTION

According to this invention, other objects are obtained by incorporating in an unpigmented aromatic polycarbonate uniformly throughout either a dialkyl hydrogen phosphite or a diaryl hydrogen phosphite or an alkyl aryl hydrogen phosphite or mixtures therof and which particular phosphites can be employed in an amount ranging from 0.01 up to about 2.0 weight percent based on the total weight of the composition. In addition, the mixture may have in admixture therewith a particular epoxy compound. The aromatic polycarbonate compositions are therefore stabilized against discoloration due to higher temperature exposure.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

EXAMPLE I

To a polycarbonate resin having an intrinsic viscosity of 0.60 as measured in dioxane at 30° C prepared by reacting 2,2-bis(4-hydroxyphenyl) propane and phosgene in an organic medium with a molecular weight regulator and catalyst, add 1.0 weight percent of titanium dioxide and 0.1 weight percent of dioctyl hydrogen phosphite based on the weight of the polycarbonate resin. After drying at 125° C, the resin mixture is molded into discs of ⅛ inch thick by 2 inch diameter at 600° and 680° F separately. As a control, the polycarbonate resin of the above is mixed with 1.0 weight percent of titanium dioxide only and molded into separate discs at 600° and 680° F after drying of the resin mixture at 125° C. The sample discs are then measured for yellowness in accordance with ASTM Yellowness Index Test D1925-63J and reflectance color measurements designated as brightness by the IDL Color Eye Colorimeter. Brightness is a measure of the light reflectance and the higher the number, the greater the amount of light reflected and thus the brighter the surface. As for Yellowness, the higher the number, the greater is the color as caused by elevated temperatures such as molding temperatures employed herein.

|  | Yellowness Index | | Brightness ($Y_{CIE}$) | |
|---|---|---|---|---|
|  | 600° F | 680° F | 600° F | 680° F |
| Sample | 6.2 | 5.2 | 81.1 | 81.1 |
| Control | 12.8 | 14.8 | 71.4 | 68.2 |

EXAMPLE II

Example I is repeated except that 0.5 weight percent of titanium dioxide and 0.05 weight percent of bis(2-ethylhexyl) hydrogen phosphite are employed herein instead of the weight percent of titanium dioxide and the dioctyl hydrogen phosphite.

The results are as follows when molded at 680° F only:

|  | Yellowness Index 680° F | Brightness ($Y_{CIE}$) 680° F |
|---|---|---|
| Sample | 6.5 | 77.4 |
| Control | 17.5 | 64.0 |

EXAMPLE III

Example I is repeated except that diphenyl hydrogen phosphite is employed herein in place of the dioctyl phosphite and no titanium dioxide is used herein.

The results obtained are essentially the same as in Example I.

EXAMPLE IV

Example III is repeated except that dilauryl hydrogen phosphite is employed herein in place of the diphenyl phosphite of Example III.

The results obtained are essentially the same as in Example III.

EXAMPLE V

To a polycarbonate powder prepared by reacting equimolar amounts of 2,2-bis(4-hydroxyphenyl) propane and phosgene in an organic medium containing a molecular weight regulator, a catalyst and an acid acceptor, separately mix 0.1 weight percent of dibutyl hydrogen phosphite, diphenyl hydrogen phosphite and dioctyl hydrogen phosphite based on the weight of polycarbonate resin. Each blend is dried overnight and extruded at about 530° F into pellets using a screw extruder.

Each sample is injection molded into test specimens 3 × 2 × ⅛ inch thick at 550° and 600° F, respectively. No color pigment is employed herein. The sample is then tested for thermal stability to discoloration in accordance with ASTM Yellowness Index Test D1925-63T using a General Electric Recording spectrophotometer. The lower the number, the less is the discoloration. The results are as follows using a control of polycarbonate resin only:

| | Yellowness Index as Molded | |
|---|---|---|
| Sample | 550° F | 600° F |
| Dibutyl hydrogen phosphite | 3.0 | 2.7 |
| Diphenyl hydrogen phosphite | 3.4 | 2.8 |
| Dioctyl hydrogen phosphite | 3.0 | 2.8 |
| Control | 4.6 | 5.0 |

EXAMPLE VI

To the polycarbonate powder of Example V, separately mix 0.02 weight percent of the phosphites of Example V instead of 0.1 weight percent and add to each 0.08 weight percent of di-3,4-epoxy-6-methylcyclohexylmethyl adipate, each being based on the weight of the polycarbonate resin. Each blend is dried overnight and test samples are prepared as in Example V. The test samples are also exposed to heat aging conditions of 7 days at 140° C. The results obtained before and after heat aging are as follows:

| | Yellowness Index | | | |
|---|---|---|---|---|
| | As Molded | | Heat Aged | |
| | 550° F | 600° F | 550° F | 600° F |
| Dibutyl hydrogen phosphite | 2.9 | 3.1 | 5.8 | 10.7 |
| Diphenyl hydrogen phosphite | 3.5 | 3.4 | 6.8 | 11.8 |
| Dioctyl hydrogen phosphite | 2.9 | 2.8 | 4.7 | 6.1 |
| Control | 4.6 | 5.0 | 12.8 | 14.8 |

The instant invention is directed to a heat and color stable unpigmented aromatic polycarbonate resin wherein the aromatic polycarbonate resin has uniformly dispersed throughout a particular stabilizer, which stabilizer is either a dialkyl hydrogen phosphite or a diaryl hydrogen phosphite or a mixture of the two. The amount of the particular hydrogen phosphite to be employed herein can range anywhere from 0.01 to about 2.0 weight percent based on the weight of the total composition. It is interesting to note as shown in the examples above, that when employing no hydrogen phosphite, the polycarbonate resin is subject to discoloration and reduced brightness when molded at temperatures of 600° and 680° F, respectively. By employing the particular stabilizer of the instant invention, color stability is obtained and excellent brightness is also retained.

The difunctional hydrogen phosphites employed in the practice of this invention can be either dialkyl hydrogen phosphite, diaryl hydrogen phosphite, alkyl aryl hydrogen phosphites or mixtures thereof. The alkyl portion of the dialkyl hydrogen phosphites should contain 1 to about 25 carbon atoms and the diaryl portion of the diaryl hydrogen phosphites should contain 1 to about 3 phenyl rings. Typical of some of the dialkyl or diaryl hydrogen phosphites that can be employed in the practice of this invention are dioctyl hydrogen phosphite, bis(2-ethylhexyl) hydrogen phosphite, diphenyl hydrogen phosphite, dilauryl hydrogen phosphite, di-t-butylphenyl hydrogen phosphite, ethylene hydrogen phosphite, dibutyl hydrogen phosphite, phenyl methyl hydrogen phosphite, etc.

In addition, the invention is directed to admixing with the above composition an epoxy composition as represented by the following formula:

I. Derivatives of epoxy ethane represented by the following formula:

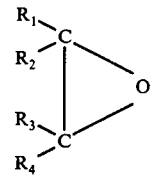

wherein $R_1$, $R_2$, $R_3$ and $R_4$ are independently selected from the group consisting of hydrogen, an alkyl radical of 1–24 carbon atoms, an aryl radical of 6–24 carbon atoms, —$CH_2OR'$, —$CH_2OCOR'$, —$CH_2OCOR''\lambda COOCH_2X$, $CH_2OR''OCH_2X$ wherein $R'$ is selected from the group consisting of an alkyl radical of 1–24 carbon atoms or an aryl radical of 6 to 24 carbon atoms and wherein $R''$ is an alkylene radical of 1–24 carbon atoms and X is an oxirane ring.

II. Derivatives of epoxy cyclohexane represented by the following formula:

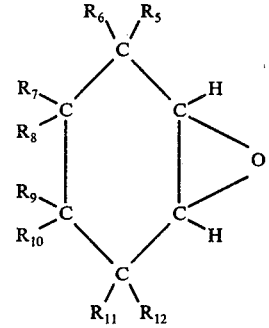

wherein $R_5$ through $R_{12}$ are independently selected from the group consisting of hydrogen, alkyl radicals of 1–24 carbon atoms —$COOR_{13}$, —$OCOR_{13}$, —$COOR_{14}X$, —$OCOR_{14}$—$COOX$ wherein $R_{13}$ is an alkyl radical of 1–24 carbon atoms and $R_{14}$ therein is an alkylene radical of 1–24 carbon atoms and X is an oxirane ring.

While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a polycarbonate would be lost at the molding temperatures employed in preparing molded articles from the composition of this invention.

The amount of epoxy employed in the practice of this invention can vary from 0.01 to 0.5 weight percent based on the weight of the polymer composition and is preferably 0.03 to 0.10 weight percent. While more than 0.5 weight percent of epoxy can be employed, it has been found that higher amounts tend to degrade the physical properties of the polycarbonate and thereby reduce the usefulness of the polymer in providing tough, flexible molded articles.

In the practice of this invention, other epoxy compounds that have been employed in place of the 3,4-epoxy-cyclohexylmethyl 3,4-epoxy-cyclohexane carboxylate with essentially the same results as those set forth previously as encompassed by the formula I and II and are 3,4-epoxy-6-methylcyclohexylmethyl, 3,4-epoxy-6-methylcyclohexane carboxylate, 2,3-epoxycyclohexylmethyl 3,4-epoxycyclohexane carboxylate, 4-(3,4-epoxy-5-methyl-cyclohexyl) butyl 3,4-epoxycyclohexane carboxylate, 3,4-epoxy-cyclohexyl ethylene oxide, cyclohexylmethyl 3,4-epoxy-cyclohexane carboxylate, 3,4-epoxy-6-methylcyclohexylmethyl-6-methylcyclohexyl carboxylate, bisphenol-A diglycidyl ether, tetrabromobisphenol-A diglycidyl ether, diglycidyl ester of phthalic acid, diglycidal ester of hexahydrophthalic acid, bis-epoxycyclohexyl adipate, butadiene diepoxide, tetraphenylethylene epoxide, octyl epoxy tallate and also, 3,4-dimethyl-1,2-epoxy cyclohexane, 3,5-dimethyl-1,2-epoxycyclohexane, 3-methyl-5-tert butyl-1,2-epoxy cyclohexane, octadecyl 2,2-dimethyl-3,4-epoxy cyclohexane carboxylate, N-butyl 2,2-dimethyl-3,4-epoxycyclohexane carboxylate, cyclohexyl 2-methyl-3,4-epoxy cyclohexane carboxylate, N-butyl 2-isopropyl-3,4-epoxy-5-methyl-cyclohexane carboxylate, octadecyl-3,4-epoxy cyclohexane carboxylate, 2 ethyl hexyl 3',4' epoxy cyclohexane carboxylate, 4,6 dimethyl 2,3 epoxy cyclohexyl 3',4'-epoxy cyclohexane carboxylate, diethyl 4,5-epoxy-cis-1,2 cyclohexane dicarboxylate, di-n-butyl 3-tert butyl-4,5-epoxy-cis-1,2 cyclohexane dicarboxylate. Specifically, any of the epoxycyclohexyl compounds meet the general formula of II and the other epoxy compounds recited herein meet the general formula of I. Preferably, the epoxy compound employed in the practice of this invention is 3,4-epoxy cyclohexylmethyl 3,4-epoxy cyclohexane carboxylate.

In the practice of this invention any aromatic polycarbonate can be employed herein. Generally, the aromatic polycarbonates are polymers of dihydric phenols. The dihydric phenols that can be employed herein are bisphenols such as bis(4-hydroxyphenyl)-methane, 2,2-bis(4-hydroxyphenyl)-propane, 2,2-bis(4-hydroxy-3-methylphenyl)-propane, 4,4-bis(4-hydroxyphenyl)-heptane, etc., dihydric phenol ethers such as bis(4-hydroxyphenyl)-ether, bis(3,5-dichloro-4-hydroxyphenyl)-ether, etc., dihydroxy diphenyls such as p,p'-dihydroxydiphenyl, 3,3'-dichloro-4,4'-dihydroxydiphenyl, etc., dihydroxyaryl sulfones such as bis(4-hydroxyphenyl)-sulfone, bis(3,5-dimethyl-4-hydroxyphenyl)-sulfone, bis(3-methyl-5-ethyl-4-hydroxyphenyl)-sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,3-dichlorobenzene, 1,4-dihydroxy-3-methylbenzene, etc., and dihydroxy diphenyl sulfoxides such as bis(4-hydroxyphenyl)-sulfoxide, bis(3,5-dibromo-4-hydroxyphenyl)-sulfoxide, etc. A variety of additional dihydric phenols are also available to provide carbonate polymers and are disclosed in U.S. Pat. Nos. 2,999,835; 3,028,365 and 3,153,008. It is, of course, possible to employ two or more different dihydric phenols or a copolymer of a dihydric phenol with glycol, a hydroxy or an acid terminated polyester, or a dibasic acid in the event a carbonate copolymer or interpolymer rather than a homopolymer is desired for use in the preparation of the aromatic carbonate polymers of this invention.

Generally, the polycarbonates employed herein are prepared by reacting a dihydric phenol with a carbonate precursor in the presence of a molecular weight regulator and an acid acceptor. The carbonate precursors that can be used herein are either a carbonyl halide, a carbonate ester or a haloformate. The carbonyl halides which can be employed herein are carbonyl bromide, carbonyl chloride, carbonyl fluoride, etc. or mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) etc., di-(alkyl-phenyl) carbonates such as di-(tolyl) carbonate etc., di-(naphthyl) carbonate, di-(chloronaphthyl) carbonate, phenyl tolyl carbonate, chlorophenyl chloronaphthyl carbonate, etc. or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.) While other carbonate precursors will occur to those skilled in the art, carbonyl chloride, also known as phosgene, is preferred.

As stated previously, the reaction may be carried out in the presence of an acid acceptor, which acid acceptor may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphite of an alkali or alkaline earth metal.

The molecular weight regulators which are also employed in carrying out the process for preparing the aromatic polycarbonate resins can be such molecular weight regulators as phenol, cyclohexanol, methanol, para-tertiary-butylphenol, para-bromophenol, etc. Preferably phenol is employed as the molecular weight regulator.

It will thus be seen that the objects set forth above among those made apparent from the preceding description are efficiently attained and certain changes may be made in carrying out the above process and in the composition set forth without departing from the scope of this invention, it is intended that all matters contained in the above description shall be interpreted as illustrative and not in a limiting sense.

What is claimed is:

1. An unpigmented aromatic polycarbonate composition stabilized against heat degradation with (a) a minor amount of a phosphite selected from the group consisting of diaryl hydrogen phosphite, dialkyl hydrogen phosphite and alkyl aryl hydrogen phosphite and mixtures thereof wherein the alkyl portion contains 2-25 carbon atoms and the aryl portion contains 1-3 phenyl rings, and (b) 0.01 - 0.5 weight percent of an epoxy compound selected from the group consisting of:

I. Derivatives of epoxy ethane represented by the following formula:

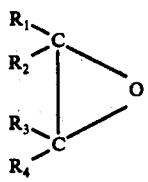

wherein $R_1$, $R_2$, $R_3$ and $R_4$ are independently selected from the group consisting of hydrogen, an alkyl radical of 1-24 carbon atoms, an aryl radical of 6-24 carbon atoms, —$CH_2OR'$, —$CH_2OCOR'$, —$CH_2OCOR''COOCH_2X$, $CH_2OR''OCH_2X$ wherein $R'$ is selected from the group consisting of an alkyl radical of 1-24 carbon atoms or an aryl radical of 6 to 24 carbon atoms and wherein $R''$ is an alkylene radical of 1-24 carbon atoms and X is an oxirane ring.

II. Derivatives of epoxy cyclohexane represented by the following formula:

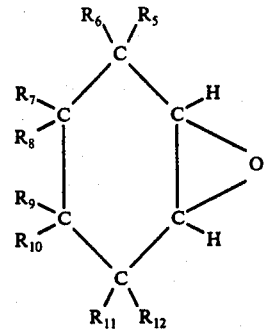

wherein $R_5$ through $R_{12}$ are independently selected from the group consisting of hydrogen, alkyl radicals of 1-24 carbon atoms, —$COOR_{13}$, —$OCOR_{13}$, —$COOR_{14}X$, —$OCOR_{14}$—$COOX$ wherein $R_{13}$ is an alkyl radical of 1-24 carbon atoms and $R_{14}$ therein is an alkylene radical of 1-24 carbon atoms and X is an oxirane ring.

2. The composition of claim 1 wherein the amount of phosphite is 0.01 - 2.0 weight percent based on the weight of aromatic polycarbonate composition.

3. The composition of claim 1 wherein the dialkyl hydrogen phosphite is dioctyl hydrogen phosphite.

4. The composition of claim 1 wherein the diaryl hydrogen phosphite is diphenyl hydrogen phosphite.

5. The composition of claim 1 wherein the epoxy compound is di-3,4-epoxy-6-methylcyclohexylmethyl adipate.

6. The composition of claim 1 wherein the epoxy compound is 3,4-epoxy cyclohexylmethyl 3,4-epoxy cyclohexane carboxylate.

* * * * *